(Model.)

O. P. WOLCOTT.
DISK PLOW.

No. 596,390. Patented Dec. 28, 1897.

Witnesses:
F. L. Ourand
Jo. L. Coombs

Inventor:
Oliver P. Wolcott
by Louis Bagger & Co.,
Attorneys.

UNITED STATES PATENT OFFICE.

OLIVER P. WOLCOTT, OF DALLAS, TEXAS.

DISK PLOW.

SPECIFICATION forming part of Letters Patent No. 596,390, dated December 28, 1897.

Application filed July 7, 1897. Serial No. 643,734. (Model.)

*To all whom it may concern:*

Be it known that I, OLIVER P. WOLCOTT, a citizen of the United States, and a resident of Dallas, in the county of Dallas and State of Texas, have invented certain new and useful Improvements in Disk Plows; and I do hereby declare that the following is a full, clear, and exact description of the invention, which will enable others skilled in the art to which it appertains to make and use the same, reference being had to the accompanying drawings, which form a part of this specification.

My invention relates to disk or revolving plows; and its object is to provide an improved attachment or cutter therefor which travels in advance of the disk which undercuts part of the unplowed soil, and the disk which follows cuts the remainder and turns the ground, leaving the furrow level, and at the same time the cutter will hold the disk down to its work.

The invention consists, essentially, in the novel construction and combination of parts hereinafter fully described and claimed.

Figure 1:
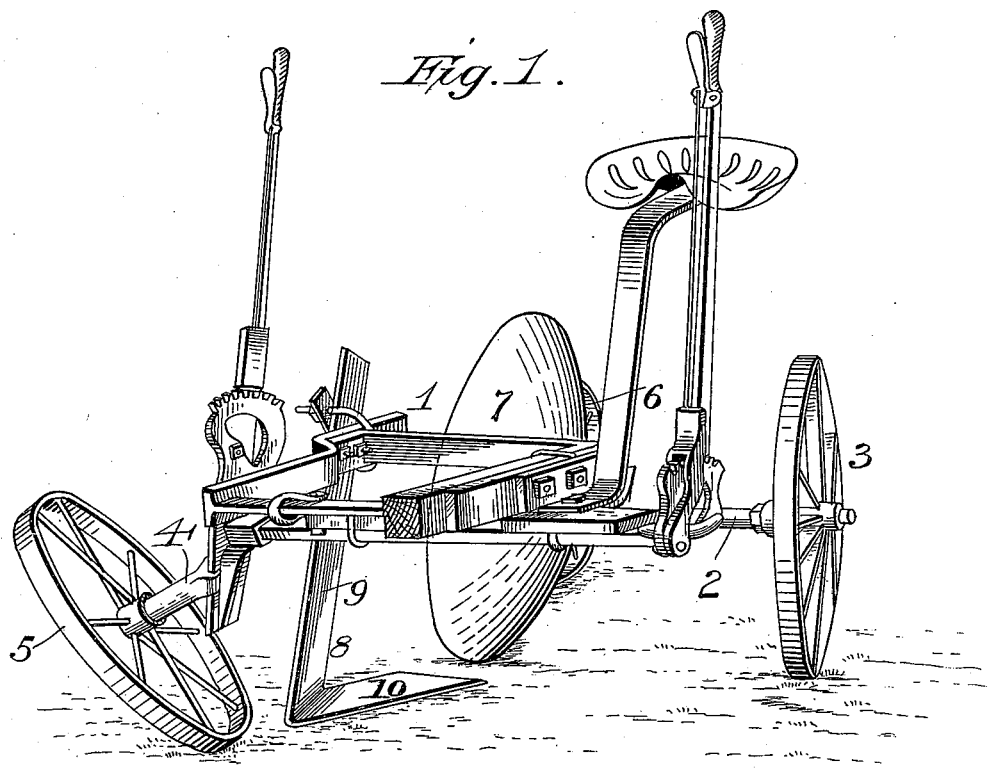
Figure 2:
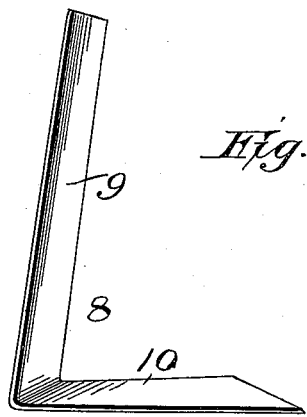

In the accompanying drawings, Figure 1 is a perspective view of a disk or revolving plow constructed in accordance with my invention. Fig. 2 is a detail perspective view of the cutter removed.

In the said drawings the reference-numeral 1 designates the plow-frame, and 2 the axle, provided with a main driving-wheel 3. The opposite end of the frame is provided with an inclined axle 4, to which is journaled the inclined wheel 5, and at the rear is a steering or caster wheel 6.

The numeral 7 designates the revolving disk, which is set at an angle to the line of draft, so as to engage with the soil and turn the furrow.

The parts so far described may be of any ordinary or usual construction, and a detailed description thereof and of the other accessorial parts which form no part of my invention is not necessary.

The numeral 8 designates my improved cutter, consisting of a forwardly-inclined standard 9, having its lower end turned or bent inwardly at a right angle, forming a horizontal blade 10, the front of which is formed with an inclined cutting edge. The disk 7 is concavo-convex and is inclined at an angle to the line of draft. The horizontal blade travels in front of the concave side of the disk and parallel with the line of draft of the plow. By this construction in operation the horizontal blade will undercut the soil in advance of the disk, making a perfectly level cut, and the disk following the blade will cut and turn the furrow. By this means the disk will be held to its work and the furrow will be cut and turned more expeditiously than if the cutter were dispensed with.

Having thus fully described my invention, what I claim is—

1. In a rotary plow, the combination with the furrow cutter and turner, consisting of the rotatable concavo-convex disk located at an angle to the line of draft, of the horizontal cutter located in front of said disk, opposite the concave surface thereof and provided with a forwardly-extending standard, substantially as described.

2. In a plow, the combination with the concavo-convex disk, located at an angle to the line of draft, of the downwardly-extending bar having its lower end bent or turned inwardly forming a flat horizontal blade, having its front end formed with an inclined cutting edge and which travels in advance of the concave side of the disk and in a line parallel with the line of draft, substantially as described.

In testimony that I claim the foregoing as my own I have hereunto affixed my signature in presence of two witnesses.

OLIVER P. WOLCOTT.

Witnesses:
HOMAN STARKE,
T. N. COLLIER.